Sept. 12, 1944.   A. CARLIN   2,358,142
HAND TOOL
Original Filed Sept. 22, 1941   2 Sheets-Sheet 2

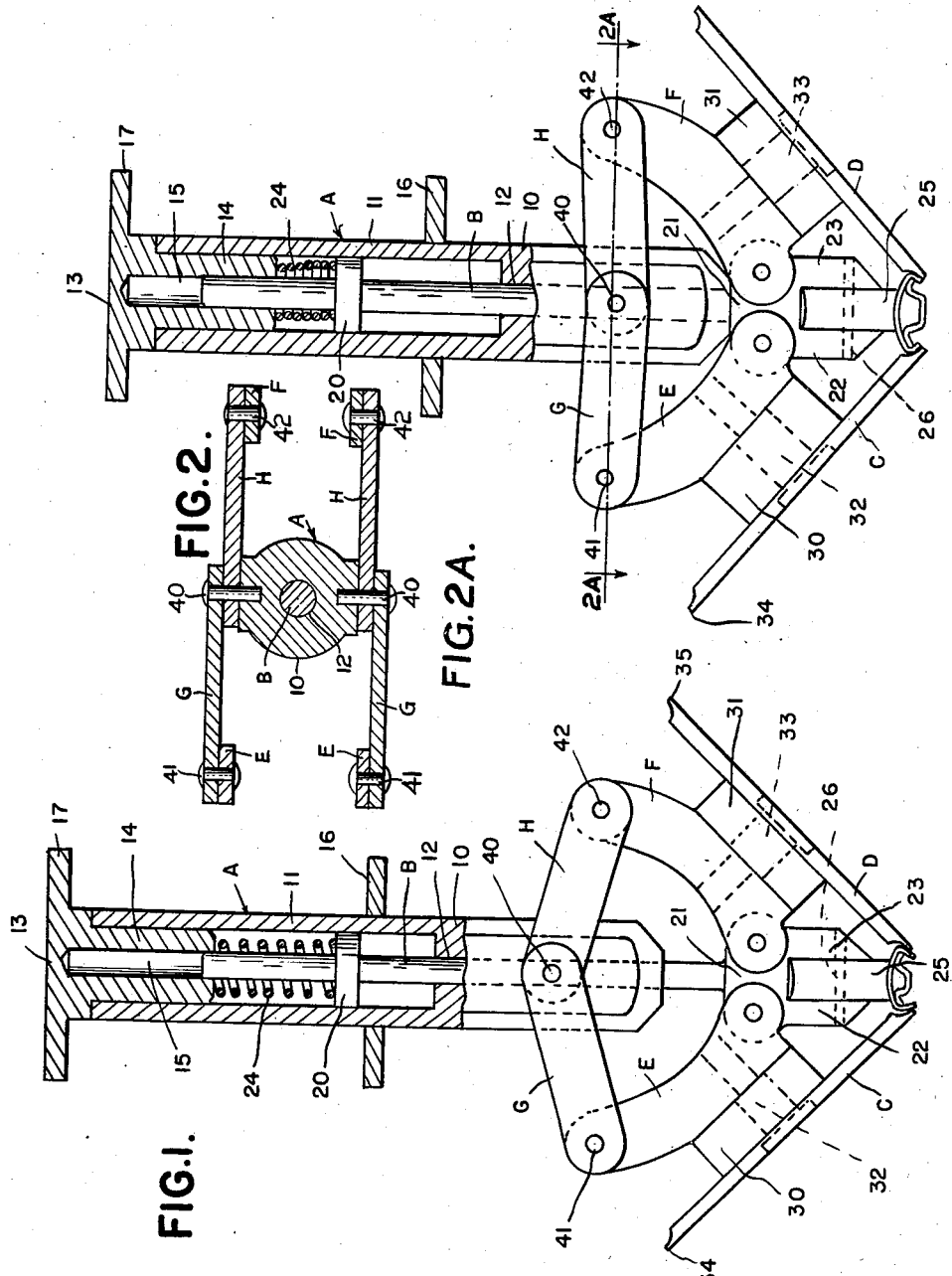

INVENTOR.
ALEXANDER CARLIN
BY
ATTORNEYS

Patented Sept. 12, 1944

2,358,142

UNITED STATES PATENT OFFICE 2,358,142

HAND TOOL

Alexander Carlin, Detroit, Mich., assignor to National Automotive Fibres, Incorporated, Detroit, Mich., a corporation of Delaware Original application September 22, 1941, Serial No. 411,940. Divided and this application September 8, 1942, Serial No. 457,677

4 Claims. (Cl. 81—15)

This invention relates generally to metal working tools and refers more particularly to a hand tool for interlocking one or more portions of one element with one or more portions of another element to connect the two elements together.

The invention forming the subject matter of this application is a division of my application filed September 22, 1941, bearing Serial No. 411,940.

One of the essential objects of the invention is to provide a tool that may be easily and quickly engaged with the portions to be interlocked and that requires very little effort on the part of the operator to effect the interlock mentioned.

Another object is to provide a tool that may be used to interlock the side flanges of relatively long strips to lateral flanges of correspondingly long strips.

Another object is to provide a tool that may be locked in engaged position with the flanges to be interlocked and then slid along the strips to effect an interlock between the flanges throughout the length of the strips.

Another object is to provide a tool having means, preferably in the form of a roller, for initially forcing one strip, such as a cover strip, downwardly in straddling relation upon another strip, such as a base strip, and has other means for effecting the interlock between the flanges of said strips.

Another object is to provide a tool that not only may be used to effect the interlock mentioned but also may be used, when repairs are desirable or necessary, to effect another interlock or a better interlock after such parts have initially been interlocked as aforesaid, or by some other device or apparatus. For example, it may be necessary after an automobile has been in use to repair a trim panel thereof upon which the strips mentioned have been initially assembled by the manufacturer. The tool could be used by a repair man to reassemble the strips on the trim panel when the repairs are made thereto.

Another object is to provide a tool that is simple in construction, economical to manufacture, and efficient in operation.

Other objects, advantages and novel details of construction of this invention will be made more apparent as this description proceeds, especially when considered in connection with the accompanying drawings, wherein:

Figure 1 is a front elevation, shown in section, of a hand tool embodying my invention;

Figure 2 is a view similar to Figure 1, but showing the position of the parts after the body has been moved downwardly relative to the plunger, so that the rollers are in operative work engaging position;

Figure 2A is a cross sectional view taken on line 2A—2A of Figure 2;

Figure 3:
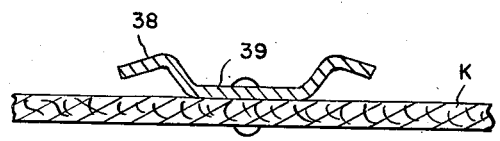
Figure 3 is a vertical sectional view through a trim panel and base strip secured thereto.

Referring now to the drawings, A is the body, B is the plunger, C and D, respectively, are work engaging rollers, E and F, respectively, are supports for said rollers, and G and H, respectively, are actuating links for said supports of a hand tool embodying my invention.

As shown, the body A is substantially cylindrical in configuration and has a lower portion 10 and a tubular upper portion 11. The portion 10 is provided throughout its length with an axially extending bore 12 for the plunger B, while the tubular portion 11 is provided at its upper open end with a closure 13 having a depending cylindrical portion 14 fitting within the tubular portion 11 of the body and provided with an axially extending bore 15 for receiving the plunger B. The exterior of the body A between an annulus 16 fixed thereto midway its ends and a lateral flange 17 of the closure may be used as a handle for the operator of the tool.

The plunger B is substantially cylindrical in configuration and slidably engages the bores 12 and 15, respectively, in the body A and closure 13. Preferably the plunger B has an annular flange 20 within the tubular portion 11 of the body in spaced relation to the lower end of the depending portion 14 of the closure and is provided beneath the lower end of the body A with a head 21 having depending arms 22 and 23, respectively. A coil spring 24 is sleeved upon the plunger B between the flange 20 thereof and the cylindrical portion 14 of the closure and normally holds the head 21 in spaced relation to the lower end of the body A, while a work engaging roller 25 is rotatably mounted on a shaft 26 carried by the arms 22 and 23.

The work engaging rollers C and D are disposed at substantially right angles to each other and have hubs 30 and 31, respectively, rotatably mounted on pins 32 and 33, respectively, carried by the supports E and F. The peripheries of these rollers C and D are provided with flanges 34 and 35, respectively, for bending the flanges 36 of a cover strip 37 inwardly under laterally projecting flanges 38 of a supporting base strip 39.

The supports E and F for the rollers C and D are in the form of longitudinally curved links and are pivoted at their inner ends to the head 21 of the plunger B. Such supports curve upwardly toward opposite sides of the body A and terminate above the lower end thereof.

The actuating links G and H are pivotally connected at their outer ends to the outer ends of the supports E and F and are pivoted at their inner ends to diametrically opposite points of the body A. Such links G and H are straight throughout their length and have their inner pivotal connections 40 with the body A at such a point relative to their outer pivotal connections 41 and 42, respectively, with the supports E and F that the inner connections 40 will be moved downwardly from the normal elevated position illustrated in Figure 1 past a horizontal line coincident with the outer connections 41 and 42 to a lowered position below said line to establish a toggle lock when the body A is moved downwardly relative to the head 21, as illustrated in Figure 2. Thus, the rollers C and D will be locked in operative work engaging position.

Figure 6:
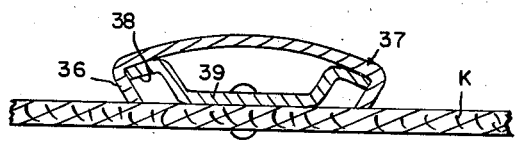
Figure 6 is a view similar to Figure 5 but showing the side flanges of the cover strip bent inwardly in interlocked relation with the lateral flanges of the base strip.

From the foregoing it will be apparent that the roller 25 of the tool is adapted to engage the top of the cover strip 37 and press such strip downwardly into straddling relation with the base strip 39, as illustrated in Figure 1, while the rollers C and D are adapted to bend the side flanges 36 of the cover strip 37 inwardly beneath the lateral flanges 38 of the base strip 39 to obtain the interlocked assembly illustrated in Figures 2 and 6, respectively.

Figure 4:
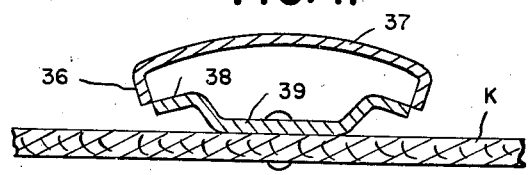
Figure 4 is a view similar to Figure 3 but showing a cover strip in its initial position in registration with the base strip for assembly therewith.

Initially the base strip 39 is anchored to a trim panel K as illustrated in Figure 3. Then the cover strip 37 is placed over and in registration with the base strip as illustrated in Figure 4. At this point the cover strip 37 may be pressed downwardly by hand or by the roller 25 of the tool to the position illustrated in Figure 5. Finally the side flanges 36 of the cover strip 37 are bent inwardly by the rollers C and D to provide the interlocked assembly illustrated in Figure 6.

Figure 5:
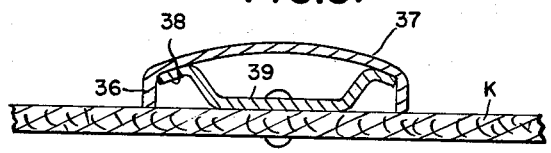
Figure 5 is a view similar to Figure 4 but showing the cover strip pressed downwardly into straddling relation with the base strip.

In operation the tool is initially positioned over the strips 37 and 39, respectively, as assembled in Figure 4 or Figure 5. If the cover strip 37 has not previously been forced down by hand over the base strip 39 from the position illustrated in Figure 4 to the position illustrated in Figure 5 sufficient downward pressure is provided on the closure 13 to force the cover strip 37 downwardly to the position illustrated in Figures 1 and 5. Upon the application of further downward pressure the parts assume the position illustrated in Figure 2, in which it will be observed that the body A has moved downwardly until it has engaged the head 21 and has compressed the spring 24. The plunger B has moved upwardly in the bores 12 and 15 in the body A and closure 13, respectively. The downward movement of the body A moves the pivot connection 40 of the links G and H downwardly with a toggle movement. It will be observed that the inner pivotal connections for the links G and H in Figure 2 have moved to a position slightly below a horizontal line coincident with the outer pivotal connections 41 and 42, respectively, with the supports E and F. The toggle motion rocks the supports E and F outwardly about their inner pivotal connections with the head 21. This has the effect of moving the rollers C and D inwardly with respect to the cover strip 37. Due to the relatively great mechanical advantage obtained by the toggle linkage thus described, the downwardly depending side flanges 36 of the cover strip 37 are forced inwardly beneath the lateral flanges 38 of the base strip 39. Once the body A has been moved downwardly to the position illustrated in Figure 2 it will be retained in such downward position by virtue of the toggle lock above described created by the downward movement of the pivotal connection 40 below the horizontal line coincident with the outer pivotal connections 41 and 42. However, upon release of downward pressure on the body A the spring 24 will move the body upwardly in a manner to disengage the rollers C and D from the cover strip 37 and thereby return the parts to the normal inoperative position illustrated in Figure 1.

After the rollers C and D have been locked in their operative work engaging position, as illustrated in Figure 2, the tool may then be drawn along the assembled base strip 39 and cover strip 37 so that the roller 25 will engage and move downwardly if necessary the cover strip 37 as aforesaid and the rollers C and D will bend the downwardly extending side flanges 36 of the cover strip 37 inwardly below the laterally projecting flanges 38 of the base strip 39. The rollers C and D may be provided with suitable antifriction bearing (not shown) so that a minimum of force is required to draw the hand tool along the assembled strips as described.

What I claim as my invention is:

1. A hand tool of the class described having an elongated body constituting a handle and provided with a tubular end portion, a closure for the tubular end portion, a plunger slidable longitudinally in said body and provided in the tubular end portion with a flange, said plunger extending endwise from the body at the other end thereof remote to the closure and provided at its outer free end with a head, a coil spring sleeved on the plunger between the flange thereon and the closure and normally holding the head of the plunger in spaced relation to the body, supporting elements connected to said head and extending laterally and upwardly therefrom, a rotatable element carried by said head for pressing a marginally flanged cover strip downwardly into straddle relation upon a laterally flanged base strip, opposed rotatable elements carried by said supporting elements at opposite sides of said head for effecting an interlock between the flanges of the cover strip and base strip, and means operable during movement of the body in one direction relative to the plunger for moving the opposed rotatable elements toward each other into operative engagement with the work and operable during movement of the body in the opposite direction relative to the plunger for moving the opposed rotatable elements away from each other and the work, including members connected to the body and supporting elements.

2. A hand tool of the class described having an elongated body constituting a handle and provided with a tubular end portion, a closure for the tubular end portion, a plunger slidable longitudinally in said body and provided in the tubular end portion with a flange, said plunger extending endwise from the body at the other end thereof remote to the closure and provided at its outer free end with a head, means between the flange on the plunger and the closure normally holding the head of the plunger in spaced relation to the body, supporting elements connected to said head and extending laterally and upwardly therefrom, means carried by said head for pressing a marginally flanged cover strip downwardly into straddling relation upon a laterally flanged base strip, opposed rotatable elements carried by said supporting elements at opposite sides of said head for effecting an interlock between the flanges of the cover strip and base strip, and means operable during movement of the body in one direction relative to the plunger for moving the opposed rotatable elements toward each other into operative engagement with the work and operable during movement of the body in the opposite direction relative to the plunger for moving the opposed rotatable elements away from each other and the work, including members connected to the body and supporting elements.

3. A hand tool of the class described having an elongated body constituting a handle and provided with a tubular end portion, a closure for the tubular end portion, a plunger slidable longitudinally in said body and provided in the tubular end portion with a flange, said plunger extending endwise from the body at the other end thereof remote to the closure and provided at its outer free end with a head, yieldable means sleeved on the plunger between the flange thereon and the closure and normally holding the head of the plunger in spaced relation to the body, supporting elements connected to said head and extending laterally and upwardly therefrom, a rotatable element carried by said head for pressing a marginally flanged cover strip downwardly into straddling relation upon a laterally flanged base strip, means carried by said supporting elements at opposite sides of said head for effecting an interlock between the flanges of the cover strip and base strip, and means operable during movement of the body in one direction relative to the plunger for moving the means just mentioned into operative engagement with the work and operable during movement of the body in the opposite direction relative to the plunger for moving said means away from the work, including members connected to the body and supporting elements.

4. A hand tool of the class described having an elongated body constituting a handle and provided with a tubular end portion, a closure for the tubular end portion, a plunger slidable longitudinally in said body and provided in the tubular end portion with an abutment, said plunger extending endwise through the body at the other end thereof remote to the closure and provided at its outer free end with a bifurcated head, yieldable means within the tubular end portion of the body between said abutment and said closure and normally holding the head of the plunger in spaced relation to the adjacent end of the body, supporting elements connected to said head and extending laterally and upwardly therefrom, a rotatable element between and carried by the furcations of said head for pressing a marginally flanged cover strip downwardly into straddling relation upon a laterally flanged base strip, opposed rotatable elements carried by said supporting elements at opposite sides of said head and having means for effecting an interlock between the flanges of the cover strip and base strip, and means operable during movement of the body in one direction relative to the plunger for moving the opposed rotatable elements toward each other into operative engagement with the work and operable during movement of the body in the opposite direction relative to the plunger for moving the opposed rotatable elements away from each other and the work, including members connected to the body and supporting elements.

ALEXANDER CARLIN.